No. 1661. Benjamin F. Sturtevant Original Patent Dec. 2. 1863.

*Improvement in the Manufacture of Tooth Picks.*

Reissued April. 26. 1864.

Witnesses F. Gould
S. B. Ridden

Benj. F. Sturtevant
By his Attys
J. B. Crosby

UNITED STATES PATENT OFFICE.

BENJAMIN F. STURTEVANT, OF BOSTON, MASSACHUSETTS.

IMPROVEMENT IN TOOTH-PICKS.

Specification forming part of Letters Patent No. 38,768, dated June 2, 1863; Reissue No. 1,661, dated April 26, 1864.

*To all whom it may concern:*

Be it known that I, BENJAMIN F. STURTEVANT, a citizen of the United States of America, and a resident of Boston, in the county of Suffolk and State of Massachusetts, have invented a new and useful Improvement in the Manufacture of Tooth-Picks; and I do hereby declare the same to be fully described in the following specification and represented in the accompanying drawings.

Previous to my invention wooden tooth-picks, as articles of commerce and manufacture, were made abroad by hand-labor, and were imported into the United States. These were necessarily irregular in shape, and were expensive.

My invention consists in a new article of manufacture—viz., machine-made tooth-picks, when these are made from a band or strips of wood of uniform cross-section—the characteristic of the invention being that the form of the tooth-pick when viewed one way is that of the cross-section of the band or strip of wood from which it is made, while its form when viewed the other way is determined by the action of the mechanism by which it is cut from said strip, each tooth-pick cut being a fac-simile of that precedingly formed. Such tooth-picks differ from any made prior to my invention, in that they are perfectly uniform, each with the others, owing to which fact they can be packed in extremely small compass, and also in the fact that they can be produced very many per cent. cheaper than any heretofore made.

My invention further consists in a band or strip of wood, cut in a spiral form from a log of wood, and having chamfers or bevels at its opposite edges, the whole being in order that when said chamferred band may be introduced into a suitable machine, like a brad or sprig-cutting machine, the said strip, by the action of such machine, may be reduced into such tooth-picks.

Figure 3:
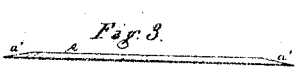
Figure 2:
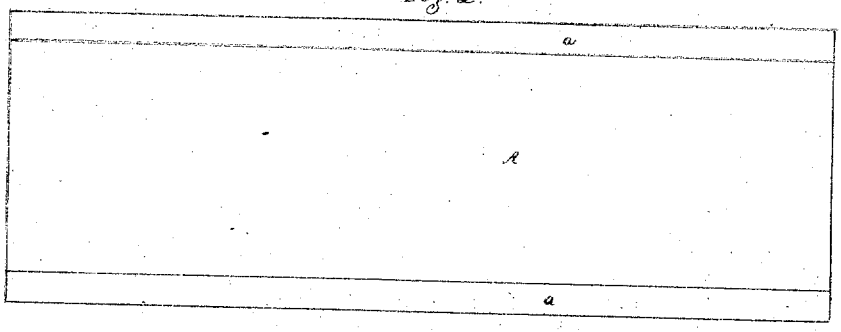
Figure 4:
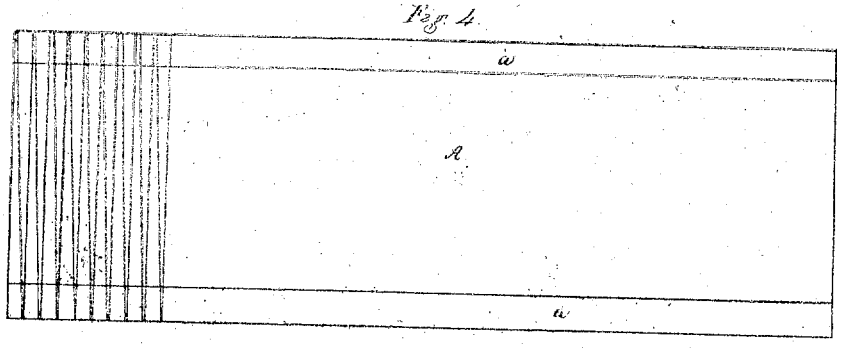
Figure 1:
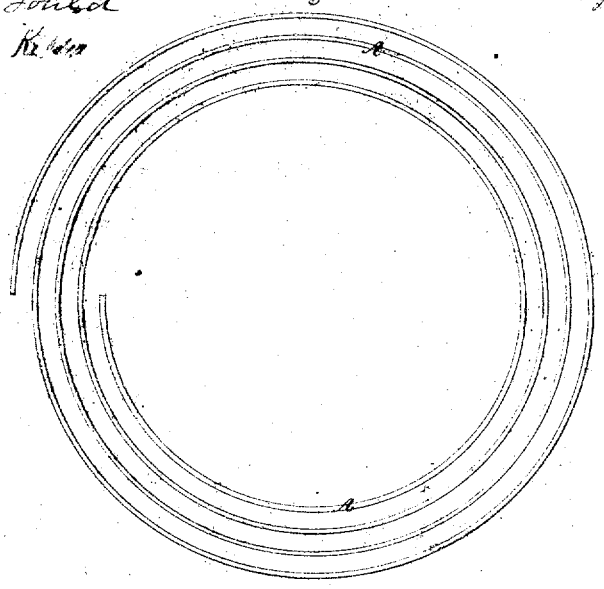

Figure 1 of the drawings denotes an edge view of the strip or band as taken from a log, while Fig. 2 is a top view of a portion of it. Fig. 3 is a transverse section of it. Fig. 4 represents a top view of a portion of it, and by the red lines the positions and directions of the cuts by which it may be reduced into tooth-picks having the shape as represented in side view in Fig. 5, and in edge view in Fig. 6.

In the said drawings, Figs. 2 and 4, A is the band, while *a a* are the chamfers or bevels at its two opposite edges, which are parallel.

Figure 5:
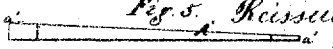
Figure 6:
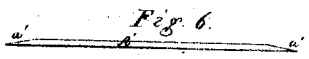

In Figs. 3, 5, and 6, A′ denotes the body of the pick, and *a′ a′* the chamfered point or head thereof.

In cutting the picks, I generally introduce the strip A between two feed-rollers, which carry the end onto and projecting beyond a horizontal bed, and so as to be presented to the action of a rotating knife or cutter projecting from a rotary disk-plate. After such knife severs the pick from the strip, and before it or an opposite knife again reaches said strip, the feed-rollers receive a rocking or vibratory movement, which swings the blank or strip around so that each successive cut is on an angle to the last cut, the effect being to give the tapering form to the picks, as shown in Figs. 4 and 5 by red lines. This operation, as will be seen, utilizes all the material, each successive piece cut off forming a perfect pick and being a counterpart of the one previously cut.

Differently contrived and operated mechanism may be employed in cutting the picks, and different forms may be given to the pick, while they retain the peculiarity of even thickness and of uniform shape and size, each with the others.

The blank or strip A is cut from a log substantially as the shoe-peg blank patented by me on the 16th day of August, 1859, is cut by the machines, also patented by me December 27, 1859, and suitable knives may be added to such machines to cut the chamfers or under edges of the blank, which make the points of the picks; or said chamfers may be separately cut by mechanism made for that purpose.

I claim—

1. As a new article of manufacture, a machine-made tooth-pick cut from a band or strip in such a manner that the form of the pick one way corresponds with the cross-section of the band, while its form the other way is determined by the shape of the cutter or cutters and movement given to the strip or to the cutter, or to both.

2. Making tooth-picks with bevels or chamfers at the opposite ends ~~of each~~ from a blank or band chamfered at its opposite edges, substantially as specified.

B. F. STURTEVANT.

Witnesses:

F. GOULD,

C. FORSTER, Jr.